UNITED STATES PATENT OFFICE 1,983,344

MANUFACTURE OF THERAPEUTIC CALCIUM PREPARATIONS

Vincent Christina, Bayside, N. Y., assignor to Intravenous Products Co. of America, Inc., New York, N. Y., a corporation of New York No Drawing. Application March 17, 1933, Serial No. 661,354

9 Claims. (Cl. 167—68)

This invention relates to the process of manufacture of therapeutic calcium preparations for intravenous injections.

More specifically the invention relates to the process of manufacture of a specific salt of calcium, to wit: calcium gluconate, it being knowledge at the present time that calcium gluconate causes less irritation or necrosis and less toxicity than other calcium salts having equal calcium contents.

The main object of the invention therefore is to provide a process of manufacturing calcium gluconate whereby the solubility thereof is increased from its regular 3% solubility in cold water to a 10% solubility. A 10% solution of calcium gluconate is a supersaturated solution but by the process hereinafter to be disclosed in the manufacture thereof, such a supersaturated solution is stable and permanent when exposed to the cold for indefinite periods.

It has been found that permanent and completely stable supersaturated solutions of calcium gluconate are obtained if calcium gluconate is permitted to form a solution with distilled water, the hydrogen ion concentration of which is adjusted to approximately either a pH of 6.0 or 8.0. Such a solution at either pH value upon standing at room temperature is capable of containing 10% content of calcium gluconate. The solution thereby formed is capable of being filtered and sterilized and then passed into sterile ampuls, such ampuls containing a permanent, stable and supersaturated solution of calcium gluconate having been prepared without the intervention of any heating process.

Apparently the reason for the permanent and stable supersaturated solution of calcium gluconate so prepared, resides in the presence of a specific hydrogen ion concentration.

The method employed in the preparation of such a supersaturated solution of calcium gluconate containing a desired 10% content of calcium gluconate is as follows:

A 10% suspension of calcium gluconate is made in distilled water, the hydrogen ion concentration of which is adjusted to approximately either a pH value of 6.0 or 8.0. This solution at either pH is allowed to stand at room temperature until the suspension dissolves. The solution is thereafter filtered. For purposes of sterilization the solution is passed through a Berkefield filter and thereafter stored into sterile ampuls. An alternative method of sterilization is to pass the filtered solution into ampuls, which said ampuls are sterilized at a 15 pound pressure for about 30 minutes, the said sterilized ampuls serving as a sterilization for the stored supersaturated solution of calcium gluconate.

I claim:

1. A process for the preparation of supersaturated aqueous solutions of calcium gluconate, comprising the steps of preparing concentrated calcium gluconate solution the pH of which is maintained at a value of approximately 6.0 and introducing the said solution into containers and heating the latter for purposes of sterilization.

2. A process for the preparation of supersaturated aqueous solutions of calcium gluconate, comprising the steps of preparing a concentrated calcium gluconate solution the pH of which is maintained at a value of approximately 8.0 and introducing the said solution into containers and heating the latter for purposes of sterilization.

3. A process for the preparation of supersaturated aqueous solutions of calcium gluconate, comprising the steps of preparing a concentrated calcium gluconate solution the pH of which is maintained at a value of approximately one unit removed from neutrality, and thereafter sterilizing the said solution.

4. In the preparation of supersaturated aqueous solutions of calcium gluconate, the step of adjusting the pH of the solution to a value approximately one unit removed from neutrality.

5. In the preparation of supersaturated aqueous solutions of calcium gluconate, the step of adjusting the pH of the solution to a value of approximately 6.0.

6. In the preparation of supersaturated aqueous solutions of calcium gluconate, the step of adjusting the pH of the solution to a value of approximately 8.0.

7. A stable supersaturated solution of calcium gluconate having a pH value approximately one unit removed from neutrality.

8. A stable supersaturated solution of calcium gluconate having a pH value of approximately 6.0.

9. A stable supersaturated solution of calcium gluconate having a pH value of approximately 8.0.

VINCENT CHRISTINA.